United States Patent [19]

Mathauser

[11] Patent Number: 4,665,803
[45] Date of Patent: May 19, 1987

[54] HYDRAULIC BRAKE ACTUATING DEVICE FOR BICYCLES

[76] Inventor: William R. Mathauser, 3000 "B" Ave., Anacortes, Wash. 98221

[21] Appl. No.: 726,642

[22] Filed: Apr. 24, 1985

[51] Int. Cl.$^4$ ................ F01B 19/00; B60T 11/16
[52] U.S. Cl. ................................ 92/99; 60/594; 188/344
[58] Field of Search ............. 188/344, 24.11; 60/533, 60/594; 92/99, 128, 129; 403/326

[56] References Cited

U.S. PATENT DOCUMENTS

| | | | |
|---|---|---|---|
| 1,442,223 | 1/1923 | Knebusch | 403/326 |
| 2,641,283 | 6/1953 | Houston | 92/99 |
| 2,720,564 | 10/1955 | Soreng et al. | 92/99 |
| 2,733,572 | 2/1956 | Butterfield et al. | 60/533 |
| 2,877,996 | 3/1959 | Kinney et al. | 92/129 X |
| 3,269,276 | 8/1966 | Natanson | 60/533 |
| 3,899,057 | 8/1975 | Carre | 188/344 |
| 4,391,353 | 7/1983 | Mathauser | 188/344 |

*Primary Examiner*—Robert E. Garrett
*Assistant Examiner*—Mark A. Williamson
*Attorney, Agent, or Firm*—Shoemaker and Mattare, Ltd.

[57] ABSTRACT

A brake actuating master cylinder unit for bicycles and the like comprising a unit mountable upon the handlebars of a bicycle, a master cylinder having a piston mounted therewithin, a bellofram secured to the inner surface of the master cylinder at one end thereof and at the piston engaging closed end thereof secured to the piston by means of a plurality of projecting tits extending through complementary apertures in the piston. A snap ring preferably is used to positively secure the tits with the piston. A two-part piston rod is employed between the piston and the brake actuating handle to allow same to return to the normal, non-actuated position freely and without withdrawing the piston therealong. This two-part slidable connection permits positive actuation of the piston during braking operation, but yet permits free separation and non-positive return upon completion of the brake actuation.

14 Claims, 6 Drawing Figures

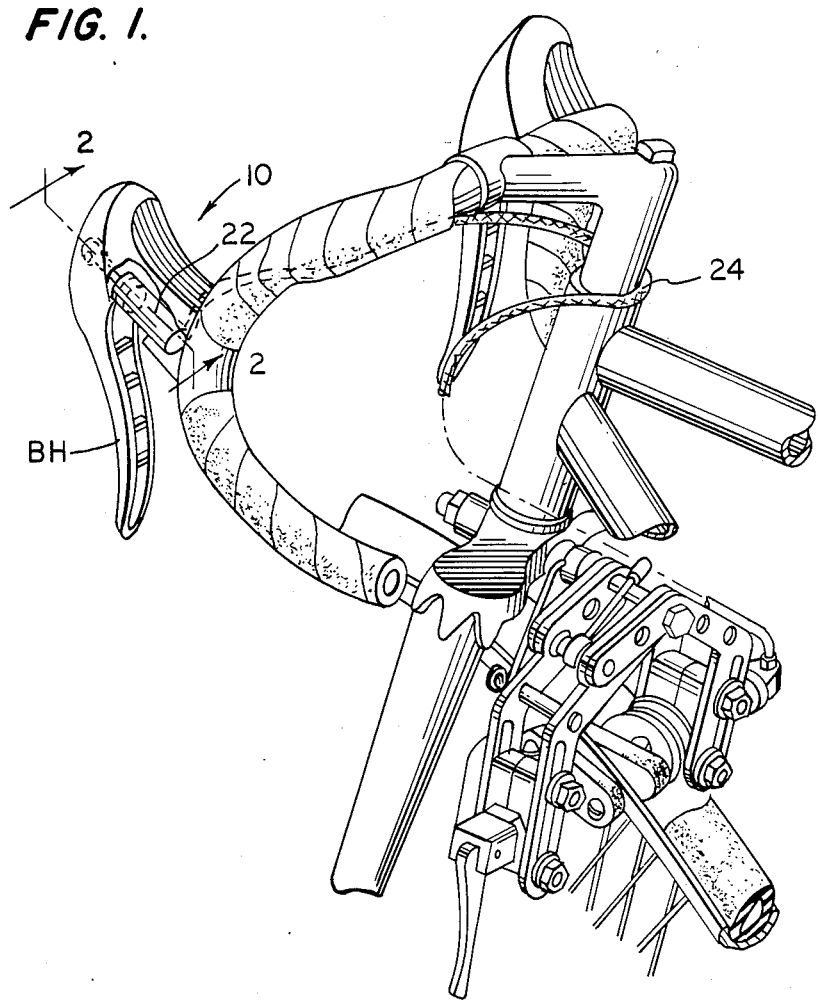
FIG. 1.
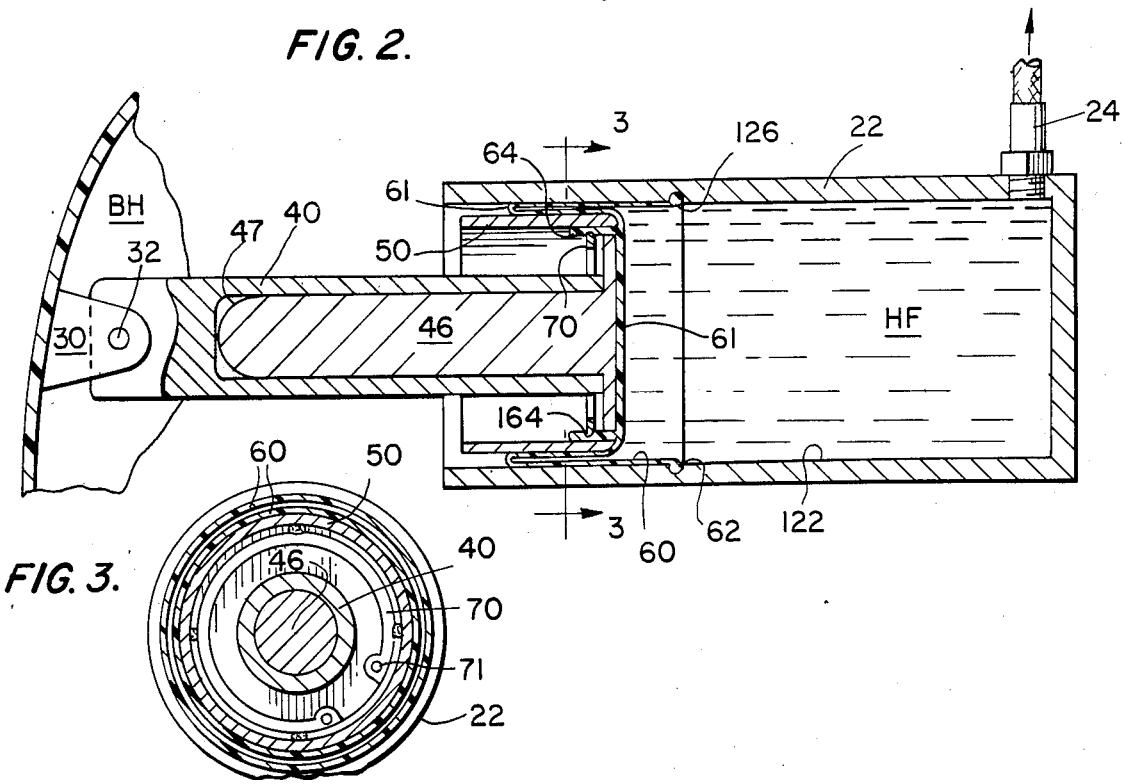
FIG. 2.
FIG. 3.

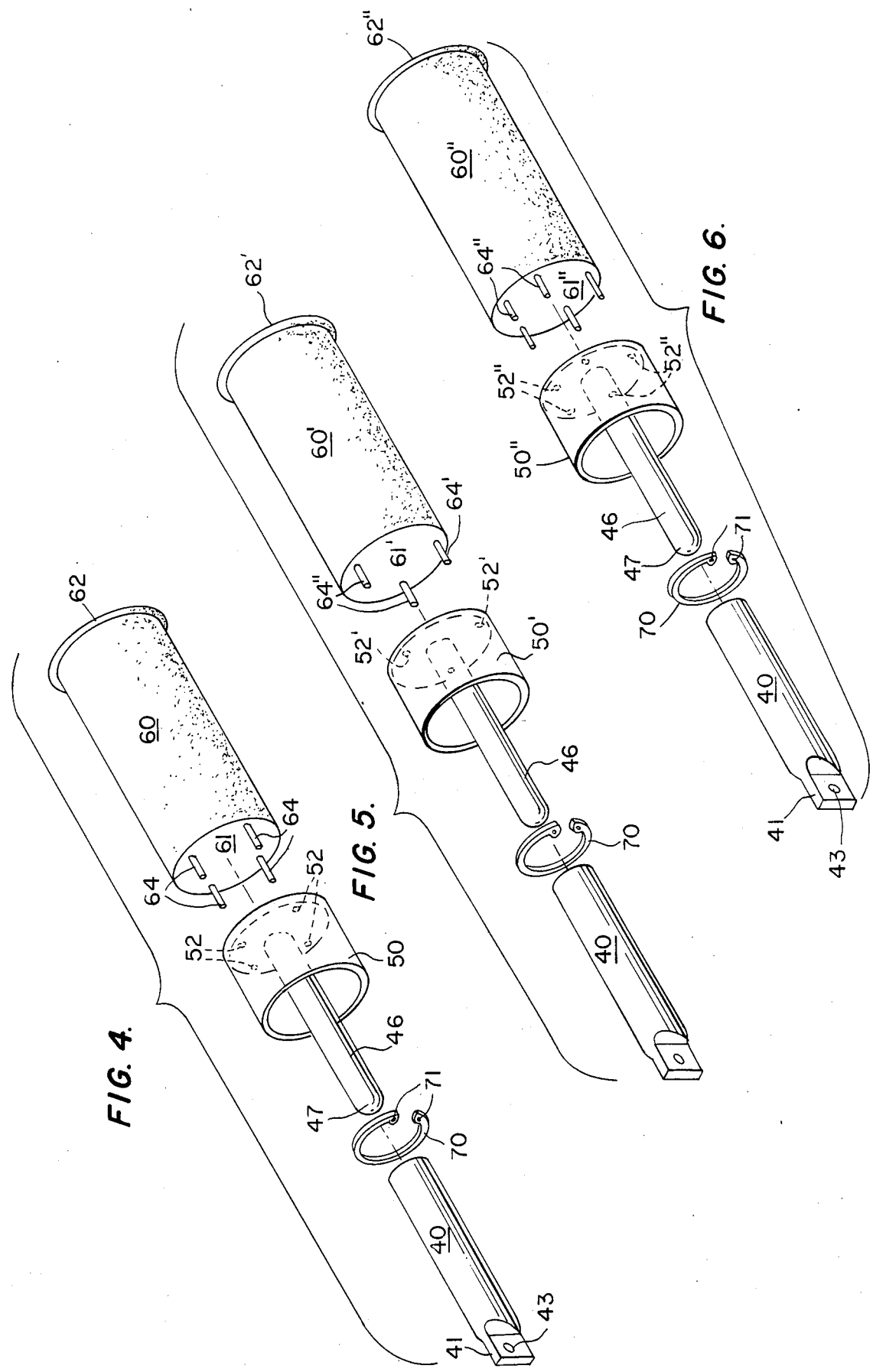

HYDRAULIC BRAKE ACTUATING DEVICE FOR BICYCLES

BACKGROUND OF THE INVENTION

1. Field of the Invention

This invention relates generally to hydraulic brake actuating mechanisms for bicycles, and specifically to an improved master cylinder hydraulic braking device for mounting on the handlebars of a bicycle.

2. Description of the Prior Art

A common problem with known type master cylinder units for bicycle hydraulic brakes is that in actual use, if a brake actuating handle is returned to its inoperable position before oil in the system can be transferred back into the cylinder, a void can develop between the head of the piston and the fluid retention bellofram within the master cylinder. Then, upon again actuating the handle, if the bellofram does not re-nest perfectly and/or the handle is pressed for another braking cycle, the bellofram can tend to jam into the cylinder between the piston and cylinder wall. Such occurrence can result in the bellofram being fractured and/or damaged. Also in this instance, the direct connection between the handle and the piston improvise the effecting of the void.

No known prior art patents or devices have successfully solved the foregoing problem, and the present invention successfully has solved same.

SUMMARY OF THE INVENTION

An object of the present invention is to provide a master cylinder unit for bicycle hydraulic brakes having a two-piece piston rod connection between a piston contained within the master cylinder and the brake actuating handle pivotally mounted thereto. Such two-piece connection will permit positive actuation of the brake piston and yet allow separation thereof in the reverse direction of movement.

Another object of the present invention is to provide a master cylinder unit for bicycle hydraulic brakes having a bellofram contained within the master cylinder between the actuating piston therewithin. Positive interconnection between the piston and the bellofram is provided.

A further object of this invention is to provide a bellofram separation between hydraulic fluid within a bicycle master cylinder and an actuating piston movable therewithin, with the positive connection being effected by a plurality of projecting tits on the bellofram portion contacting the piston which pass through complementary apertures in the piston. A retaining snap ring positively secures the piston and bellofram together.

A still further object of the present invention is to provide a compact, complete master cylinder for hydraulic brakes wherein a separable connection is provided between a brake actuating handle and a piston actuated thereby together with a bellofram secured by projecting portions passing through openings in the piston and secured therewithin by snap ring structure.

The present invention has a number of new and novel features. Among them are the fact that during an emergency situation such as an accident or the like wherein the brake actuating handle is returned sharply to its unactuated position, such force does not withdraw the piston within the master cylinder at an excess rate to create a void within the master cylinder itself. Such a void has been found in actual practice to be detrimental to the operation of a bellofram between the hydraulic fluid and the piston. Also, by providing for a positive connection between the bellofram portion which contacts the piston, a better operation is achieved. That is, the bellofram at all times is retained in contact with the piston and therefore the tendency for separation therebetween and possible damage of the bellofram itself is completely eliminated.

By providing a two-piece connection between the brake actuating handle and the piston which is in the form of a tubular portion pivotally connected to the brake actuating handle and a solid rod portion integral with the piston, a positive connection in the brake actuating direction is effected, and yet a free return of the piston separate from that of the brake actuating handle is permitted.

In the prior art having a solid piston and rod directly connected to the brake actuating handle, the piston would be fully extended and the hydraulic fluid would be transferred to the slave cylinder to activate the brakes upon actuation of the brake handle. Conventionally, there is a spring in the slave cylinder which, after being compressed, returns the oil to the system back into the master cylinder upon release of the brake actuating handle thereon. If the handle is depressed to its full extent, and all the oil transferred to the slave, and then the handle is returned to its normal position before the oil can be transferred back into the handle, it is possible for a void to develop between the head of the piston and the head of the bellofram. In such case the piston is simply mechanically pulled out of its normal nest configuration in the bellofram. Then the problem arises that if upon re-application of braking pressure the piston does not re-nest perfectly and/or the handle is pressed for another braking cycle too soon, the bellofram can tend to jam into the cylinder between the piston and cylinder wall. This has actually happened in practice, with the result of the bellofram being fractured and/or otherwise damaged. Thus, the inventor has found that it is absolutely necessary to keep the mechanical connection between the bellofram and the piston head through the entire operation of the device in any manner, even if an accident should occur. By use of a bead and little protrusions on the back of the bellofram, this has been made possible. Furthermore, to further safeguard against the possibility of losing the proper nest relationship between the piston and the bellofram, a two-piece piston and rod has been made. This structure has in tests completely eliminated any disadvantage from a possible accident involving the handle. Once the oil is transferred to the slave, it can return in its own good time and constantly keep its proper nest configuration. A simple, but yet most effective improvement, and one that is a very important advancement in the art of bicycle hydraulic brakes, is thus achieved.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the present invention.

FIG. 2 is a cross-sectional view taken generally along line 2—2 of FIG. 1.

FIG. 3 is a cross-sectional view taken generally along line 3—3 of FIG. 2.

FIG. 4 is an exploded perspective of the two-piece piston rod and piston with bellofram securing structure per se of the present invention.

FIG. 5 is another embodiment of the present invention.

FIG. 6 is a further embodiment of the present invention.

DESCRIPTION OF THE PREFERRED EMBODIMENT

Referring to FIG. 1 of the drawings, reference numeral 10 indicates in general the hydraulic brake actuating mechanism of the present invention. This device is attached to the handlebars of a bicycle by a clamp or other conventional means and contains a master cylinder unit 22 therewith. A brake actuating handle BH is pivotally mounted to the structure for actuation of a piston 50 slidably mounted within the hydraulic brake cylinder 22. As shown, a bead 62 on a bellofram 60 engages with a groove 126 in the inner wall 122 of the hydraulic cylinder. The closed end 61 of the bellofram engages with the outer surface of piston 50 and is securely attached thereto by means of a plurality of projecting tits 64.

As shown in FIGS. 2-4, these tits are four in number. Complementary apertures 52 in the piston receive the respective tits therethrough. To securely retain the bellofram in position, a snap ring 70 is preferably provided for biased engagement against the inner surfaces of these tits. As seen in FIG. 2, an indentation 164 is generally formed in each tit itself by the snap ring to assure the secure retention thereof.

As can be visualized by looking at the drawings, upon movement of the piston 50 back and forth within the cylinder, the bellofram will always be maintained in contact with the piston and provide the proper separation between the hydraulic brake fluid HF within within the cylinder and the piston.

Another important feature of the present invention is in the two-part piston rod 40 and 46. The portion 40 is substantially tubular with a pivot end 41 which is flattened and has an opening 43 therethrough for reception of the brake actuating handle pivot pin 32 therethrough. The brake handle is provided with a suitable triangular shaped pivot pin support 30 for making this connection. The other part of the piston rod is portion 46 which is a solid rod element integral with the piston 50. End 47 is rounded so that a tip portion can be engaged by the end of the tubular rod 40. As can be also visualized by looking at the drawings, if the brake handle BH is returned very quickly to its inoperative position, or normal, nonactuated position, the outer tubular portion 40 can move to the left in FIG. 2 and slide away from the solid rod portion 46 to allow same to return to the normal unactuated position of the master cylinder in its own due time. Thus, this two-part piston rod complements and provides the other important feature of the present invention, wherein the elimination of any possible voids and any possible separation of the piston and bellofram is provided.

As shown in the exploded perspective of FIG. 4, a plurality of four tits 64 and apertures 52 are provided, but other numbers are also envisioned, such as in FIG. 5 where a plurality of three tits 64' on the modified bellofram 60' complement with three apertures 52' on the modified piston 50'. FIG. 6 shows a further species of the invention, wherein a plurality of five tits 64" complement five apertures 52" in the piston 50". In all of these versions, a snap ring 70 preferably is used to secure the retention between the piston and the bellofram. Apertures 71 may be provided in the end of the snap ring 70 as is conventional for use of a snap ring removing/inserting plier.

The foregoing is considered as illustrative only of the principles of the invention. Further, since numerous modifications and changes will readily occur to those skilled in the art, it is not desired to limit the invention to the exact construction and operation shown and described, and accordingly, all suitable modificatioms and equivalents may be resorted to, falling within the scope of the invention.

I claim:

1. A hydraulic brake actuating device for use with bicycles and the like comprising:
    a master cylinder for containing hydraulic brake fluid;
    a piston mounted within said master cylinder;
    a bellofram mounted between said piston and inner cylinder wall to retain hydraulic fluid within said cylinder;
    means for positively interlocking the piston contacting portion of said bellofram with said piston;
    a brake actuating handle;
    means for permitting reverse movement of the brake actuating handle without effecting movement of said piston;
    said means for positively interlocking the bellofram and pistion comprising a plurality of at least three individual projections on said bellofram for engagement with complementary individual closed apertures in said piston; and
    a snap ring internally of said piston which is in engagement with the inside of said at least three individual projections for retaining same in position.

2. The hydraulic brake actuating device of claim 1, wherein said projections comprise a plurality of tits extending from said bellofram through said piston apertures.

3. The hydraulic brake actuating device of claim 2, wherein said tits are four in number.

4. The hydraulic brake actuating device of claim 2, wherein said tits are three in number.

5. The hydraulic brake actuating device of claim 2, wherein said tits are five in number.

6. The hydraulic brake actuating device of claim 1, wherein said means for allowing reverse movement of the brake actuating handle without effecting movement of said piston comprise a separable two-piece piston rod.

7. The hydraulic brake actuating device of claim 6, wherein said two-piece piston rod comprises an outer tubular portion and an inner solid portion.

8. The hydraulic brake actuating device of claim 7, wherein said outer tubular portion is pivotally connected to said brake actuating handle and said inner solid rod portion is integral with said piston.

9. A bicycle hydraulic master cylinder comprising: a hollow cylindrical body portion containing hydraulic fluid therewithin, a handle pivotally mounted to said cylinder, a two-piece piston rod connected between said handle and a piston mounted within said cylinder, a bellofram between the hydraulic fluid within said cylinder and the piston, interlocking means between one end of said bellofram and the inner wall of said cylinder, a plurality of three or more projection from the piston contacting portion of said bellofram and in engagement with said piston for retaining same positively therewith; said plurality of projections on said bellogram comprising a plurality of three or more tits extending through complementary individually closed apertures in said piston; and said bellofram is retained with said piston by an internal snap ring biased against the inner surfaces of said tits.

10. The bicycle hydraulic master cylinder of claim 9, wherein said two-piece piston rod structure comprises an outer tubular portion and an inner rod portion which will permit free movement of one with respect to the other upon reverse movement of said handle.

11. The bicycle hydraulic master cylinder of claim 9, wherein three tits with three complementary apertures are provided.

12. The bicycle hydraulic master cylinder of claim 9, wherein four tits with four complementary apertures are provided.

13. The bicycle hydraulic master cylinder of claim 9, wherein five tits with five complementary apertures are provided.

14. The bicycle hydraulic master cylinder of claim 9, wherein an indentation is formed in each tit to securely retain said snap ring therewith.

* * * * *